US 9,798,684 B2

(12) United States Patent
Poulsen

(10) Patent No.: US 9,798,684 B2
(45) Date of Patent: Oct. 24, 2017

(54) BUS COMMUNICATIONS WITH MULTI-DEVICE MESSAGING

(71) Applicant: BlackBerry Limited, Waterloo (CA)

(72) Inventor: Jens Kristian Poulsen, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 224 days.

(21) Appl. No.: 14/691,707

(22) Filed: Apr. 21, 2015

(65) Prior Publication Data

US 2016/0314087 A1   Oct. 27, 2016

(51) Int. Cl.
G06F 13/36   (2006.01)
G06F 13/42   (2006.01)
G06F 13/362  (2006.01)
G06F 13/38   (2006.01)

(52) U.S. Cl.
CPC ........ *G06F 13/362* (2013.01); *G06F 13/4282* (2013.01); *G06F 13/4291* (2013.01); *G06F 2213/0016* (2013.01)

(58) Field of Classification Search
None
See application file for complete search history.

(56) References Cited

U.S. PATENT DOCUMENTS

| | | | |
|---|---|---|---|
| 2003/0149819 A1 | 8/2003 | Smith et al. | |
| 2003/0149824 A1 | 8/2003 | Smith et al. | |
| 2005/0172101 A1* | 8/2005 | Mach ................. | G06F 13/4291 712/2 |
| 2013/0019039 A1* | 1/2013 | Herklots ............... | H04J 3/0602 710/105 |
| 2013/0322461 A1 | 12/2013 | Poulsen | |
| 2013/0322462 A1 | 12/2013 | Poulsen | |

FOREIGN PATENT DOCUMENTS

EP   1764703 A1   3/2007

OTHER PUBLICATIONS

EPO, Extended European Search Report relating to EP Application No. 16163663.4, dated Sep. 22, 2016.
Bossart, et al., Audio Engineering Society, Convention e-Brief, Presented at the 137th Convention, Oct. 9-12, 2014.
TPA6166A2 3.5mm Jack Detect and Headset Interface IC, Revised Jan. 2015.
NXP Semiconductors, UM10204, I C-bus specification and user manual, Rev.6—Apr. 4, 2014.

* cited by examiner

*Primary Examiner* — Scott Sun
(74) *Attorney, Agent, or Firm* — Rowand LLP

(57) ABSTRACT

Methods and systems are described for reading from or writing to a plurality of slave devices connected to a communications bus having a common data line. The slave devices are mapped to a virtual device address and the communication is initiated by the master by signaling a start condition and the virtual device address. Each of the slave devices mapped to the virtual device address identifies a register in that slave device associated with the virtual device address and, in sequence, performs a read or write operation on the bus with regard to its identified register in a respective predetermined time slot within the communication or to a corresponding virtual register address assigned to the slave device previously.

29 Claims, 13 Drawing Sheets

BUS COMMUNICATIONS WITH MULTI-DEVICE MESSAGING

FIELD

The present application generally relates to a communications bus and, in particular, to a communications protocol for obtaining data from multiple devices.

BACKGROUND

There are a number of communications protocols relating to bus communications, particularly for circuit-board level inter-chip communications. In some of these bus architectures, there is a single common data line and the protocol manages control and access to the data line. One popular example is the Inter Integrated Circuit ($I^2C$) bus communication protocol. Some developmental work is occurring to specify an improved version of $I^2C$ that may be called $I^3C$.

One of the drawbacks of the $I^2C$ protocol is that there is significant signaling overhead if the message being read or written is short in number of bits. When a master device on the bus is configured to periodically and frequently read sensor data or other small quantities of data from a number of slave devices, the protocol control overhead cost can overwhelm the size of the data being read or written resulting in an inefficiency in the transfer rate of 3-4 times as compared to a situation where only the original device data was sent and without any control information as required by the protocol.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
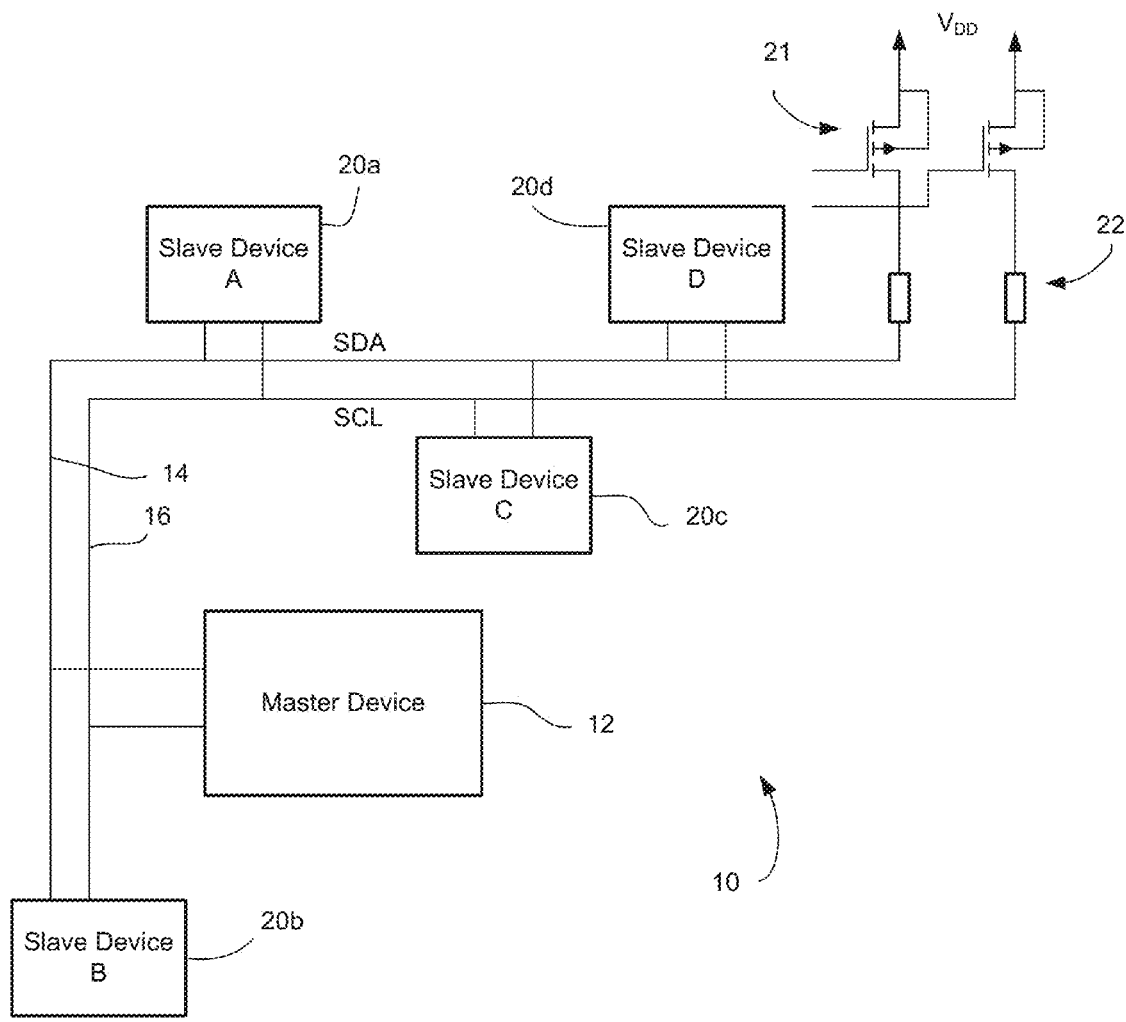
FIG. 1 diagrammatically shows one example of a multi-device two-wire bidirectional communications bus.

In one aspect, the present application describes a method of a master device reading from or writing to a plurality of slave devices connected to a communications bus having a one or more common data lines, each slave device having an associated slave device address. The method includes providing each of the slave devices with a virtual device address different from any of the slave device addresses; initiating, by the master device, a communication on the bus by signaling a start of the communication followed by the virtual device address on the data line; the slave devices detecting the start of the communication and the virtual device address and, in response, identifying a register in that slave device associated with the virtual device address, and, each slave device, in sequence, performing a bus read/write operation with regard to its identified register in a respective predetermined time slot within the communication on the data line; and terminating, by the master, the communication by signaling an end of the communication.

In another aspect, the present application describes a bus communication system including a master device; a plurality of slave devices, each slave device having an associated slave device address and storing a virtual device address different from any of the slave device addresses; and a communications bus having a one or more common data lines interconnecting the master device and the plurality of slave devices. The master device is to initiate a communication on the bus by signaling a start of the communication followed by the virtual device address on the data line. The slave devices are to detect the start of the communication and the virtual device address and, in response, identify a register in that slave device associated with the virtual device address, and, in sequence, perform a bus read/write operation with regard to its identified register in a respective predetermined time slot within the communication on the data line. The master device is to terminate the communication by signaling an end of the communication.

In yet a further aspect, the present application describes non-transitory computer-readable media storing computer-executable program instructions which, when executed, configured a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The term "registers" used herein in intended to be interpreted broadly as referring to addressable memory locations. It is not intended to be limited to particular types of memory structures, or specific integrated circuit memories. Although in some cases, a register may be implemented using discrete hardware memory component, in some cases it may be implemented within memory integral to a processing unit or other controller. In this sense, references to reading from or writing to a register in a slave device may refer to a specific portion of any memory that may be accessed using a memory address. References to a register may refer to an 8-bit memory location (a byte) in some embodiments, but may be other sizes in other embodiments.

The term "virtual device" used herein is intended to be interpreted broadly as referring to a programmable device address that can be assigned as an alternate device address to a device thereby making a device able to respond to this alternate device address.

The term "aliasing data" is intended to be interpreted broadly as reading or writing to the virtual device address and having one or more devices translate the register address that is being accessing when communicating to the virtual device to same or other register addresses within the individual devices that responds to the virtual device address. Although many of the embodiments below are described in connection with the I$^2$C-bus communication protocol, and backward compatibility with that protocol, it will be appreciated that some embodiments may conform to and/or be backward compatible with other bus communications protocols, including the I$^3$C protocol sensor bus (SensorWire) as developed by MIPI (Mobile Industry Processor Interface Alliance).

In electronic devices and systems, bus communications are often used for intra-device or inter-device command and data signaling. For example, the I$^2$C-bus is a bidirectional 2-wire bus that has become the de facto control bus standard. One wire is used for the clock and one wire for data. I$^2$C-bus (hereinafter I$^2$C) is described in "I$^2$C-bus specification and user manual", UM10204, Rev.6, Apr. 4, 2014, NXP Semiconductors N.V., the contents of which are hereby incorporated by reference.

A drawback of I$^2$C and variants with a similar structure is that there is significant signaling overhead, particularly in the case of short messages. For example, the I$^2$C structure provides that a master device on the bus first initiates a communication with a start symbol (in the case of I$^2$C, a high-to-low transition on the data line while the clock signal is high). It follows the start symbol with a 7 or 10 digit slave device address, followed by a bit indicating either a read or write command. This is then acknowledged by the slave device, following which data is put on the bus by either the master (in the case of a write) or the slave (in the case of a read). Each byte is acknowledged by either the slave or the master, respectively. To end a communication sequence, the master sends a stop symbol.

In many commercial embodiments, the read and write operations further specify a register address within the specific slave device. This means further overhead and acknowledgement bits, and in the case of a read operation a re-start symbol and re-sending of the slave device address. This communications protocol can result in the requirement of transferring over 26 bits of header data in order to read a single byte of information from a slave register. In such cases, the protocol is very inefficient with respect to the transfer efficiency due to the protocol overhead.

In some cases, a master device, such as a controller, a processor, or other such integrated circuit device, may periodically sample a number of sensor devices to implement continuous monitoring. This regular polling of a selected number of addresses may result in a large transfer overhead comparted to the quantity of data being read.

I$^2$C provides for the ability to read/write multiple registers in a slave device within one message, i.e. within one header/trailer. However, this mechanism is limited to the case where the registers are all sequentially addressed and all in the same slave device.

I$^2$C further provides a mechanism for writing to all devices at once using the global address 0000000, however this mechanism is primarily targeted at resetting the slave devices on the bus. The usefulness of this mechanism for a broadcast write operation is limited to the case where all slave devices are being updated with the same data to the same register address. Except for special corner cases, it cannot be used for a read operation because the slave devices would overwrite the combined response.

Reference is now made to FIG. 1, which diagrammatically shows an example of a two-wire bidirectional bus architecture 10. The bus architecture 10 includes at least one master device 12 connected to a data line 14 and a clock line 16, such as, for example, the SDA line and SCL lines in I$^2$C. Only one master device 12 is shown in this example.

Multiple slave devices 20 (shown as 20a, 20b, 20c, and 20d) are attached to the bus. Slave devices 20 may include any number of electronic devices of varying complexity. Non-limiting examples include A/D and D/A converters, I/O ports, RAM, EEPROMs, smart cards, tuning circuits, modems, temperature sensors, pressure sensors, light sensors, accelerometers, gyroscopes, magnetometers, other sensors, switches, drivers, clocks, etc.

The data line 14 and clock line 16 may be connected to a positive voltage supply through, in some examples, pull-up resistors 22. In some embodiments, a PMOS transistor or other active device 21 may be placed between the pull-up resistors and the bus to be able to disable these resistors, if special communication schemes are used, e.g. NRZI (Non Return to Zero Inverted), DDR (Dual Data Rate, uses both clock edge for transfer) or tri-symbol encoding (transmitting information based on two data lines and using any data change as an indication of a corresponding clock change) as described in MIPII$^3$C SensorWire bus protocol. This enables the bus to be backwards compatible with older open-collector/open drain topologies and be forward compatible with newer schemes such as NRZI.

Figure 2A:
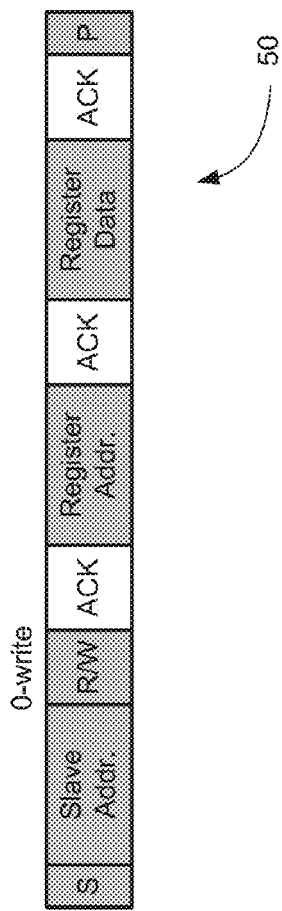
FIGS. 2A and 2B show an example structure for a write operation and an example structure for a read operation, respectively, on an $I^2C$-compliant bus.
Figure 2B:
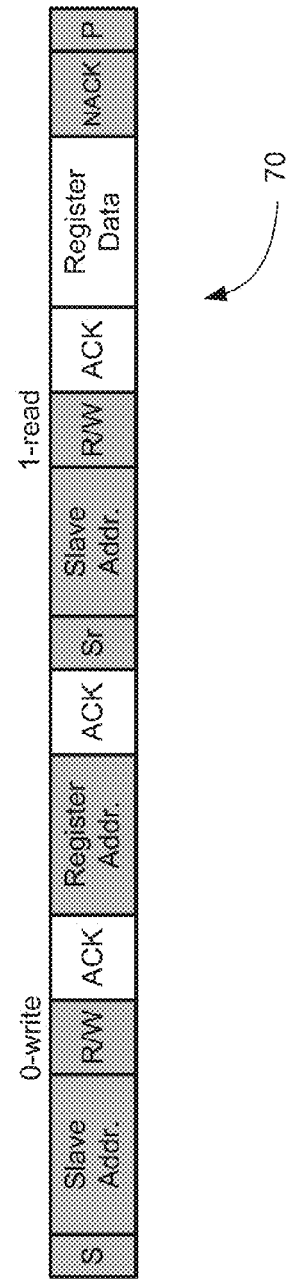

Reference is now made to FIGS. 2A and 2B, which illustrate an example structure for a write operation 50 and an example structure for a read operation 70, respectively. These example operations 50, 70 illustrate communications on an I$^2$C-compliant bus. The contributions of the master device 12 (FIG. 1) are shown in shaded portions and the contributions of the slave device 20 (FIG. 1) are shown in unshaded portions.

In both cases, it will be noted that the communication is initiated by the master device with a start symbol, followed by a 7-bit slave device address. In some embodiments, an I$^2$C slave device address may have 10-bits, but normally a 7-bit address. Other bus communications protocols may permit addresses of other lengths.

The message starts with a START event ('S') and ends with a STOP event ('P'). In case of a register read operations, a REPEATED START event is normally issued ("Sr").

Following the slave address is a read/write bit that specifies whether the master is conducting a read or a write command. In the example convention, logical zero indicates a write command and logical one indicates a read command. In the examples, the write selection is used at the first stage of the communication both for the write operation 50 and the read operation 70 because the read operation 70 involves first specifying the specific register using a write command followed by a re-start and then performing the actual read operation.

The slave device addressed by the communication then responds with acknowledge bit (or, a not acknowledge bit). The acknowledge bit (ACK) is sent by the slave device by pulling that data line low. A "not acknowledge", or NACK, bit is communicated by leaving the data line high (which would occur if the device is simply non-responsive or if an error has occurred).

Presuming that the communication was acknowledged by the addressed slave, the master device then sends the register address that is to be read from or written to. In the case of the write operation 50, this is followed by an ACK bit from the slave device and the master then sends the data to be written to the register. Each byte of data to be written to the register is acknowledged by an ACK bit from the slave device. When the write operation 50 is done, the master sends a stop symbol to signal the end of the communication.

With the read operation 70, after sending the register address and receiving an ACK from the slave device, the master device sends a repeated start symbol (a resending of a start symbol before conclusion of the communication) followed by the slave device address again. This time, the slave device address is followed by a read bit to signal that the previously provided register address is to be the subject of a read command. This is acknowledged by the slave device, which then outputs the register contents corresponding to the register address. The master then acknowledges the register data with an ACK or NACK symbol. The ACK symbol from the master device indicates that a further byte of register data should be output by the slave device. When performing multiple read operations, the further byte of register data is the next byte in the register addressing sequence, i.e. only sequentially addressed registers of the slave device may be read by the master in the same message. Reading an out-of-sequence register address would require that the master end this communication and initiate a new communication to read the new register address. Once the master device has read all the data required, it sends a NACK bit followed by the stop symbol.

In accordance with one aspect of the present application, a merged messages mechanism may be implemented by the master device and participating slave devices in order to read from or write to multiple slave devices within one message, thereby reducing the overhead associated with multi-device read/write operations. The data for individual slave devices among those participating slave devices is multiplexed into time slots assigned to individual devices to form a single long message. The time multiplexing may be based on a predetermined sequence or selected as one of a set of several possible predetermined sequences, in some embodiments. Provided the combined multi-device message uses the usual header and trailer, it will appear as a compliant bus communication, such as an I²C communication.

In some example embodiments, a "virtual slave address" is defined and communicated to the participating slave devices. In some cases, a virtual slave register or registers may be defined and each one mapped or aliased to a real register of a corresponding real slave device. By using a virtual slave address for multi-device messaging, the mechanism is backward compatible with the existing bus communication protocol. The multi-device messaging will appear to be conventional bus protocol messaging, and non-participating slave devices (e.g. classic I²C devices that do not support this new functionality) will ignore the multi-device message since it is not addressed to them.

In the examples that follow, the terms "message" and "communication" may be used interchangeably to refer to the multi-device exchange of read/write data. A single message or communication begins with a start symbol and ends with a stop symbol. The message or communication is a multi-device communication if it uses a virtual device address and more than one slave device is responsive to the virtual device address in a time-multiplexed sequence.

Figure 3:
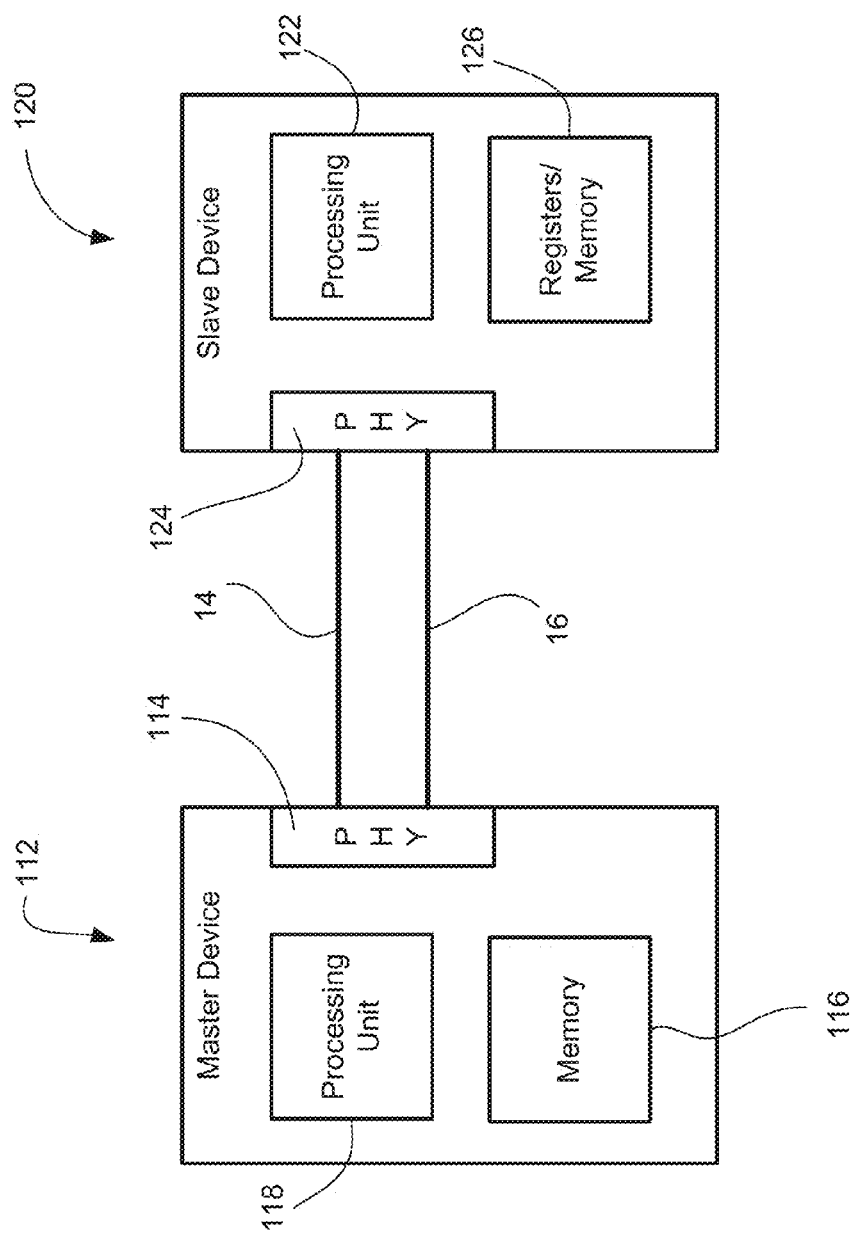
FIG. 3 shows a simplified block diagram of an example master device and an example slave device.

Reference will now be made to FIG. 3, which shows, in block diagram form, an example master device 112 and an example slave device 120. The example master device 112 and slave device 120 are connected by a two-wire communications bus with data line 14 and clock line 16. Although only one master device 112 and one slave device 120 is illustrated in FIG. 3 for ease of illustration, it will be appreciated that many embodiments will feature a plurality of master and/or slave devices connected to the same communications bus.

The master device 112 includes a processing unit 118, a memory 116, and a physical bus interface 114. The physical bus interface 114 may include circuitry for connecting to and manipulating the communications bus. In some examples, the circuitry may include flip flops, buffers, glitch removal circuits or other components for both correctly detecting voltage, symbols and/or pulse edges on the bus and for asserting symbols, voltage and/or pulse edges on the bus. In some examples, the physical bus interface 114 allows master device 112 to pull either or both of the data line 14 and clock line 16 to translate from a high DC voltage to a low DC voltage or vice-versa under the operative control of the processing unit 118. As an example the master device could translate between systems running on voltages of 1.8V and 3.3V.

The processing unit 118 may include one or more processors for controlling operation of the master device 112. In some examples the processing unit 118 may include a microprocessor or microcontroller operating under control of processor-executable program instructions that cause the processing unit 118 to carry out one or more operations in reading and or writing to the slave device 120 via the bus. The memory 116 may be integral to the processing unit 118 or separate therefrom. It may include more than one memory. The memory 116 may include volatile and/or non-volatile memory locations for storing data and/or processor-executable program instructions.

The slave device 120 includes a processing unit 122, a physical bus interface 124 and registers 126. In various embodiments, the processing unit 122 may be implemented using a microprocessor, microcontroller, field-programmable gate array, EEPROM, application-specific integrated circuit, discrete logic components implementing a control process, or other such devices. In many embodiments, the processing unit 122 includes integrated or discrete memory containing processor-executable program instructions that, when executed, cause the processor to carry out certain functions or operations, which may include the functions or operations for bus communication described herein.

The registers 126 are addressable memory locations capable of storing data. Normally, at least some portion of the registers 126 is capable of being both read from and written to by the master device 112 and/or slave device 120.

The slave device 120 may include a variety of other components for implementing its intended function, such as, but not limited to, various sensors (not shown) for obtaining data that is then stored in one or more of the registers 126.

Figure 4:
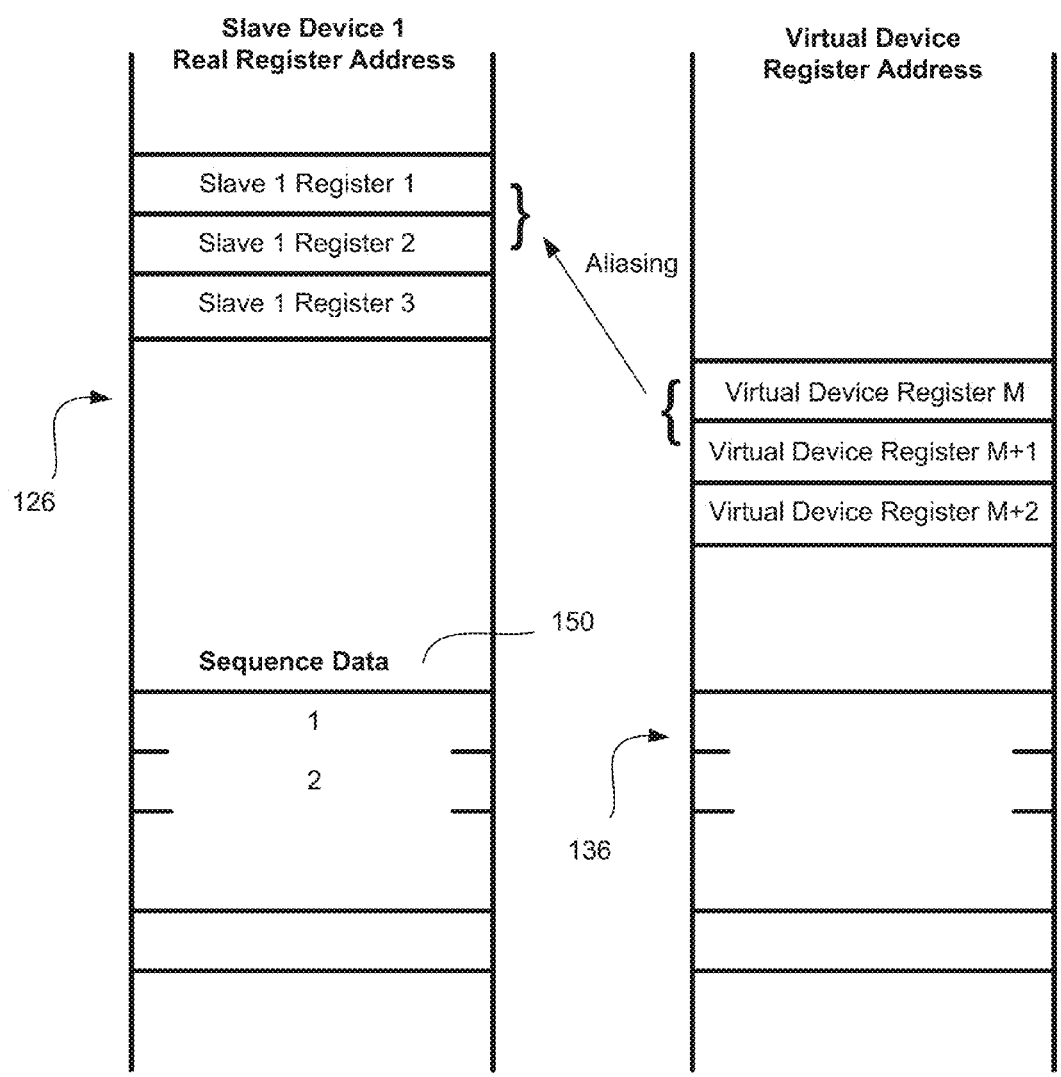
FIG. 4 diagrammatically shows aliasing between virtual device registers and slave device registers.

Reference will now be made to FIG. 4, which shows, in block diagram form, an example embodiment of the registers 126 of the slave device 120 (FIG. 3) and the mapping to the registers 136 of a "virtual" device. In this example, each byte-sized data location has an address. The virtual device register addresses are, for example, addresses M, M+1, M+2, etc. The slave devices store data in one or more registers that may be read from or written to by the master device. As examples, the registers 126 show Slave 1 Register 1, Slave 2 Register 2, etc.

In another designated location in memory, the slave device may store a correspondence between one or more virtual device register addresses and one or more of the slave device's registers. This may be termed "aliasing" data. The aliasing data may be provided by a master device. In this example, the aliasing data specifies that virtual device register address M is correlated to Slave 1 Register 1. The registers 126 may also store aliasing data specifying that virtual device register address M+1 maps to slave register address Slave 1 Register 2. The aliasing data relating to other slave devices may or may not be stored at Slave 1 in some embodiments. In some implementation the combined message may involve transfers from one slave device, in other implementations from more than one slave device.

In another embodiment, the slave device memory may contain sequence data 150, which defines one or more selectable sequences of slave devices and/or slave device registers to be read from or written to by a master device in a single message using the virtual device address. The sequence data 150 may define a state machine in some embodiments. Example implementations involving predefined sequences will be described further below.

Figure 5:
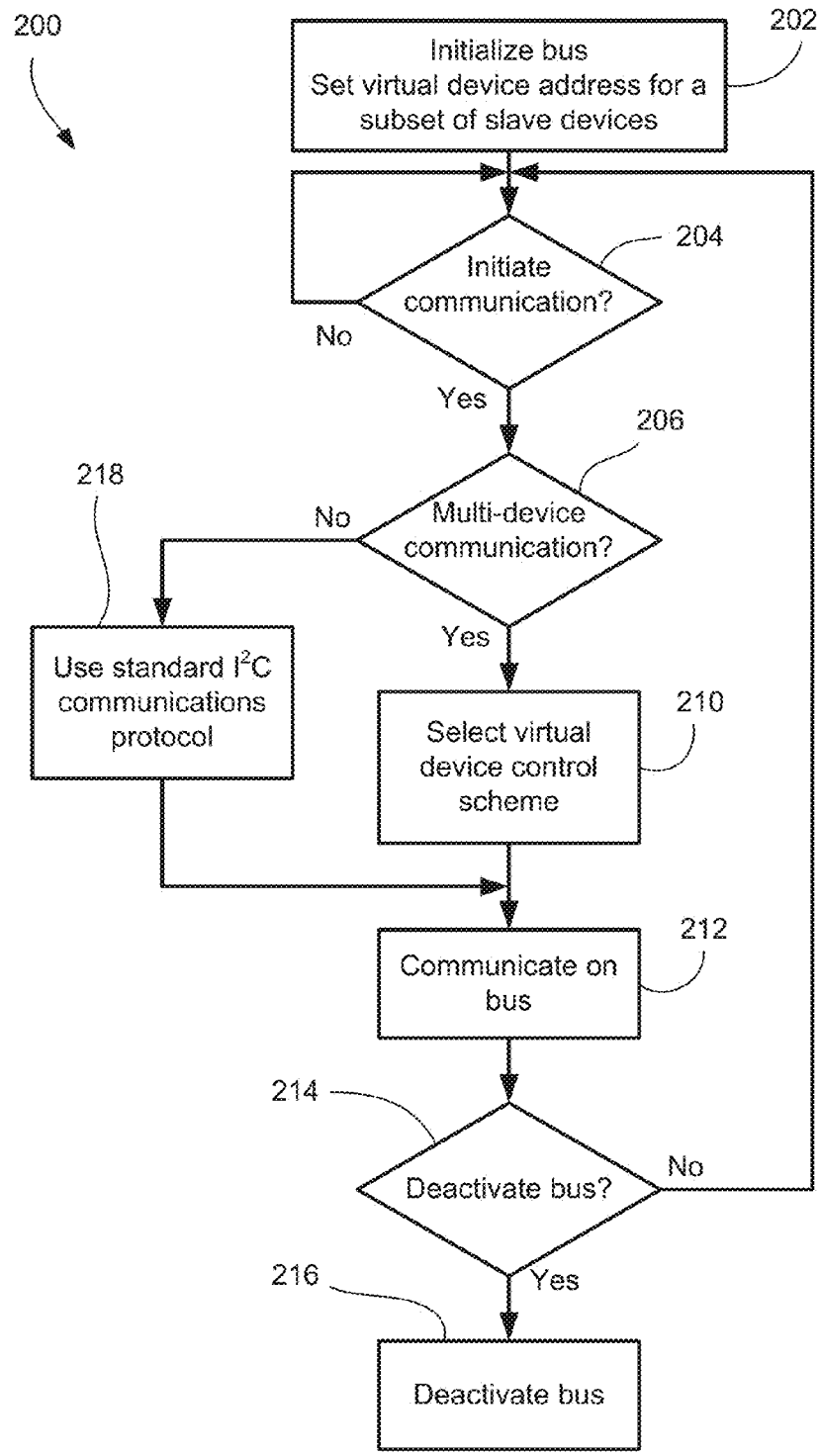
FIG. 5 shows, in flowchart form, one example method for communicating on a bus.

Reference will now be made to FIG. 5, which shows, in flowchart form, one example method 200 for communicating on a bus, wherein the bus interconnects one or more master devices and a plurality of slave devices. Each slave device has its own unique slave device address. In this embodiment, the communications bus is an I$^2$C bus.

In operation 202, a subset of two or more of the slave devices are associated with a virtual device address. The virtual device address differs from any of the slave device addresses. The master device uses the virtual device address when the master device wishes to read from or write to each of the slave devices in the subset in one communication. In some embodiments, the association may be configured in the subset of slave devices by writing the virtual device address to a designated register in each slave device of the subset. In some embodiments, the subset of slave devices may be preprogrammed with the virtual device address.

In some implementations, operation 202 may further include storing aliasing data for one or more registers of one or more of the slave devices. In some cases, the slave device associates the virtual device address with a specific register in its memory without the need for additional aliasing data. Yet in other cases, the slave device may store aliasing data mapping one or more virtual device address registers to one or more real slave device registers.

In operation 204, the master device evaluates whether it is required to initiate a communication on the bus. If so, then in operation 206, the master device determines whether a multi-device message is required. If not, then regular I$^2$C communications are implemented, as indicated in operation 208. But if multi-device message is determined to be required, then in operation 210 the master device selects a virtual device control scheme. In some instances, the master device may have more than one control scheme from which to choose. For example, different virtual device addresses may correspond to different (possibly overlapping) subsets of slave devices or different registers in the subset of slave devices, and the selection may depend on which slave devices need to be read from or written to. In another example, different virtual device addresses may correspond to different sequences of reading/writing and/or different state machines for carrying out a multi-device read/write operation. The different sequences may correspond to different subsets of slave devices and/or slave registers.

In operation 212, the master device initiates and carries out the selected communication on the bus. The master then determines whether to deactivate the bus in operation 214 and, if so, then deactivates the bus in operation 216.

Figure 6:
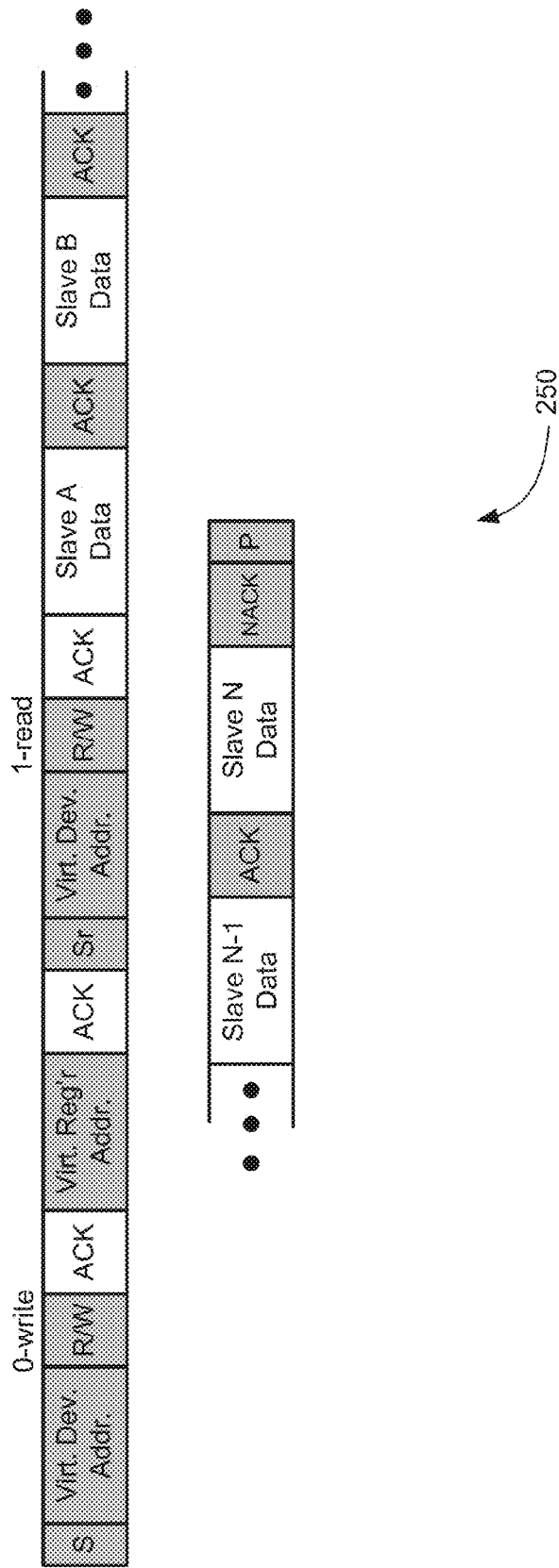
FIG. 6 diagrammatically illustrates an example structure for a read operation in accordance with one aspect of the present application.

FIG. 6 diagrammatically illustrates an example structure 250 for a read operation in accordance with one aspect of the present application. This example structure 250 is based upon an embodiment in which at least one slave device contains aliasing data mapping a slave device register to a virtual device register address.

The example structure 250 for the communication begins with a start symbol output by the master device, which initiates the communication. This is followed by the virtual device address and a read/write bit. In this example, a write bit appears, which is then followed by an ACK bit from the slave devices that recognize the virtual device address. Note that all slave devices in the subset, i.e. that recognize the virtual device address, provide the ACK reply. That is, each of the slave devices in the subset pulls the data line low. If one of the devices in the subset is inoperative, it's failure to ACK the virtual device address will go undetected as long as at least one of the slave devices in the subset pulls the data line low.

After the ACK, a virtual register address is provided by the master device. The virtual register address is received by the slave devices of the subset, which then consult aliasing mapping data (or a sequence selection logic) to determine which real slave register is mapped to the virtual register address. After the virtual register address, the slave devices in the subset send an ACK (in this example, all slave devices in the subset that map to the virtual device address respond with ACK, and not just the slave device that contains the real slave register corresponding to the virtual register address, to remain compatible with I$^2$C protocol.)

In the case of aliasing data, the slave registers are mapped to a sequence of virtual register addresses. In that way, by starting with the lowest virtual register address, the master device may then consecutively read each of the different slave devices/registers in a single message because they are mapped to a sequential set of virtual register addresses. Of course, the master device may elect to start with a virtual register address other than the numerically lowest one, provided the master device does not need to read the slave registers corresponding to the lower virtual register addresses (since the repeated read operation will read consecutive registers from a starting point and increment upwards in address).

Referring still to FIG. 6, after the ACK from the subset of slave devices, the master device sends a repeated start symbol followed by the virtual device address again and a read bit. This is ACK'd by the slave devices of the subset, which then, in sequence in accordance with the aliasing data, begin providing data from the aliased slave device registers. In particular, the slave device register that corresponds to the virtual register address provided earlier in the communication is read and its contents put on the bus. If the master device intends to continue reading slave device registers in sequence, the master device responds with an ACK. The slave devices that are part of the subset understand that this signifies the end of the first read and increments the internal virtual register address. The aliasing information provides a mapping between the virtual register addresses and specific slave device/slave registers combination. That slave device then outputs the corresponding register data to the bus. The read sequence continues until the master device sends a NACK (leaves the data bus high) and then terminates the message with a stop symbol.

Figure 11A:
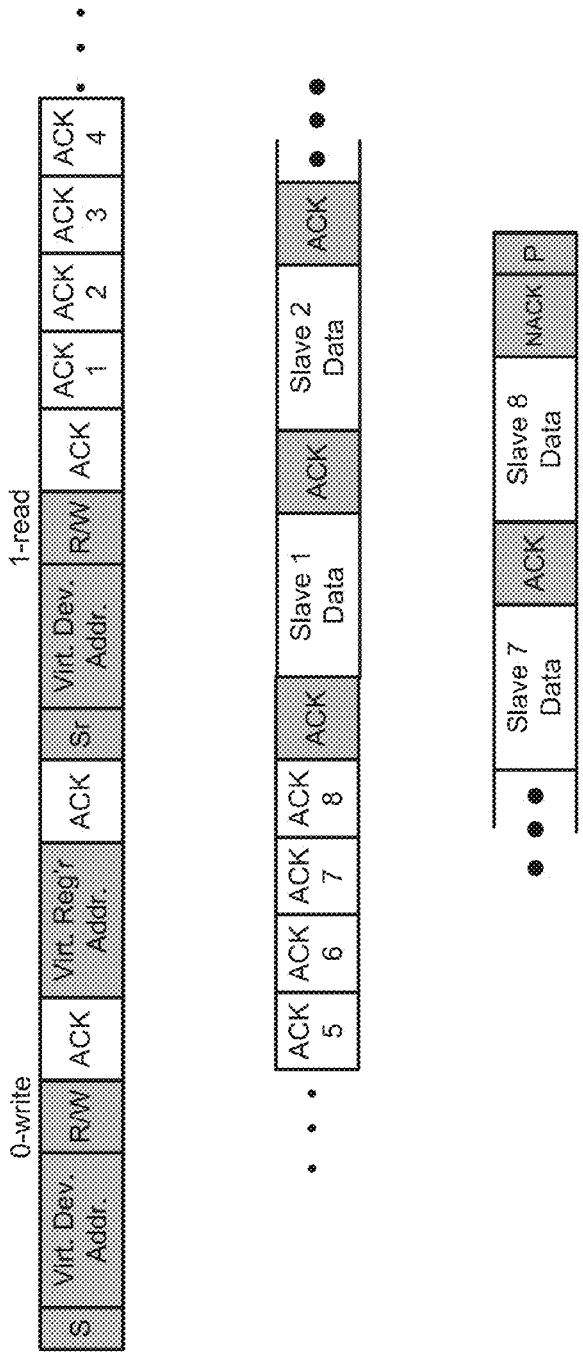
FIGS. 11A and 11B show example messages structures that include multiple individual slave ACK responses in a single message.

In one embodiment, the structure may be modified to address the fact that all the slave devices send an ACK to the virtual device address, thereby preventing the master device from knowing if one of the slave devices is incapacitated. In this example embodiment, the structure provides for one or more bytes near the beginning or end of the transmission in which each of the slave devices sends an ACK in a predefined sequence so as to signal that each device is active and available. In this way, the master can determine if all devices are responding to the message. Reference is made to FIG. 11A, which shows one example structure 252 of a message in which an individual sequence of acknowledgements is provided by the slave devices. In yet other embodiments, the master may initiate a combined message but, when the message is directed to a single device only, this way the ACK condition could be unique.

Figure 11B:
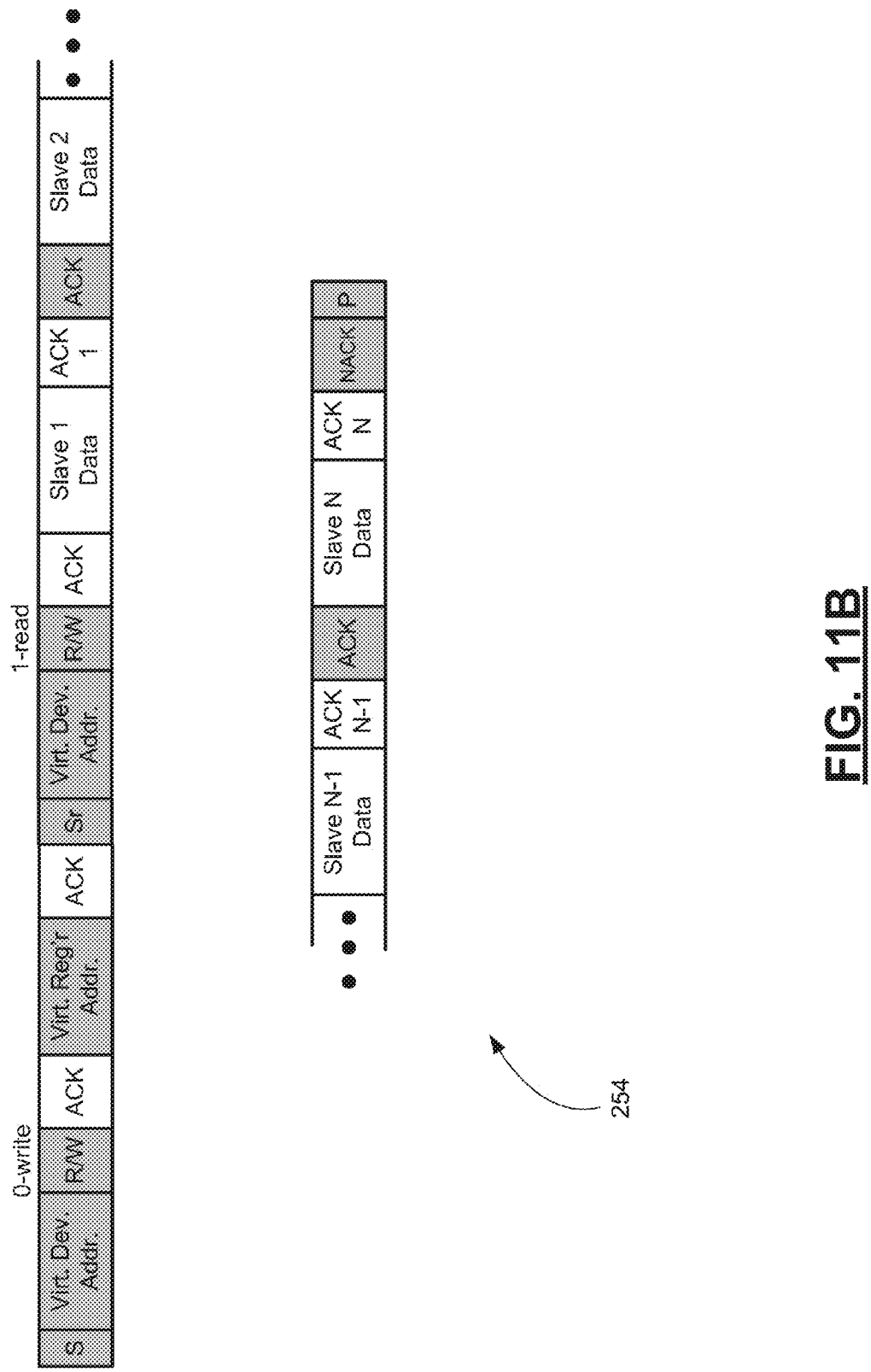

In other embodiments, the bit in the response (e.g. the first or last bit in each response) from each individual device will signify if the device acknowledged the virtual device address or not. FIG. 11B shows an example structure 254 of a message having such a feature. This structure may be simpler to implement than adding a header with a combined ACK response. In some embodiments, the master ACK bit in a read sequence may be replaced by a slave ACK bit instead.

Figure 11C:
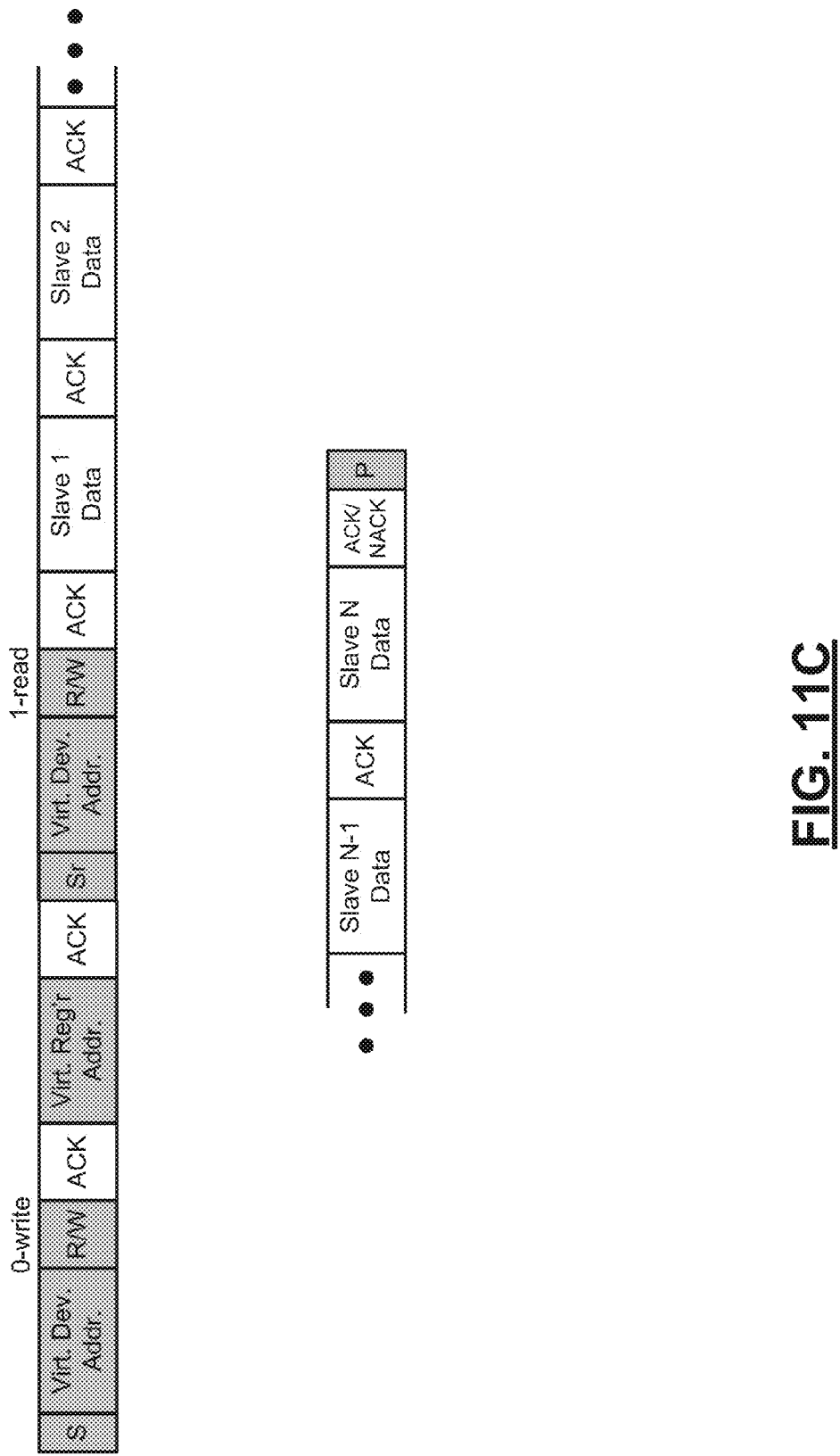
FIG. 11C shows an example message structure in which the slave devices send ACK bits during a read rather than the master device.

In yet other embodiments, as illustrated by FIG. 11C, during read commands the driver of the ACK bit may be a slave device, instead of the master, after the read is performed from that slave. This will still work with the end of a message if a finite pre-programmed sequence is used to control the read, because the slave devices will know when the last device has responded or the last register has been read. Therefore, there is no need for the master to send a NACK and thereby disable devices from sending any more data. Otherwise, and in the normal case, the slave would need the NACK from the master in order to stop sending register data and guarantee the master is able to send a STOP ('P') symbol. In this embodiment, it is possible to get unique ACK values from each device involved in the read sequence without adding extra bits to the read sequence. In some cases, the last ACK time slot may be signaled as an NACK instead for backwards compatibility.

Figure 7:
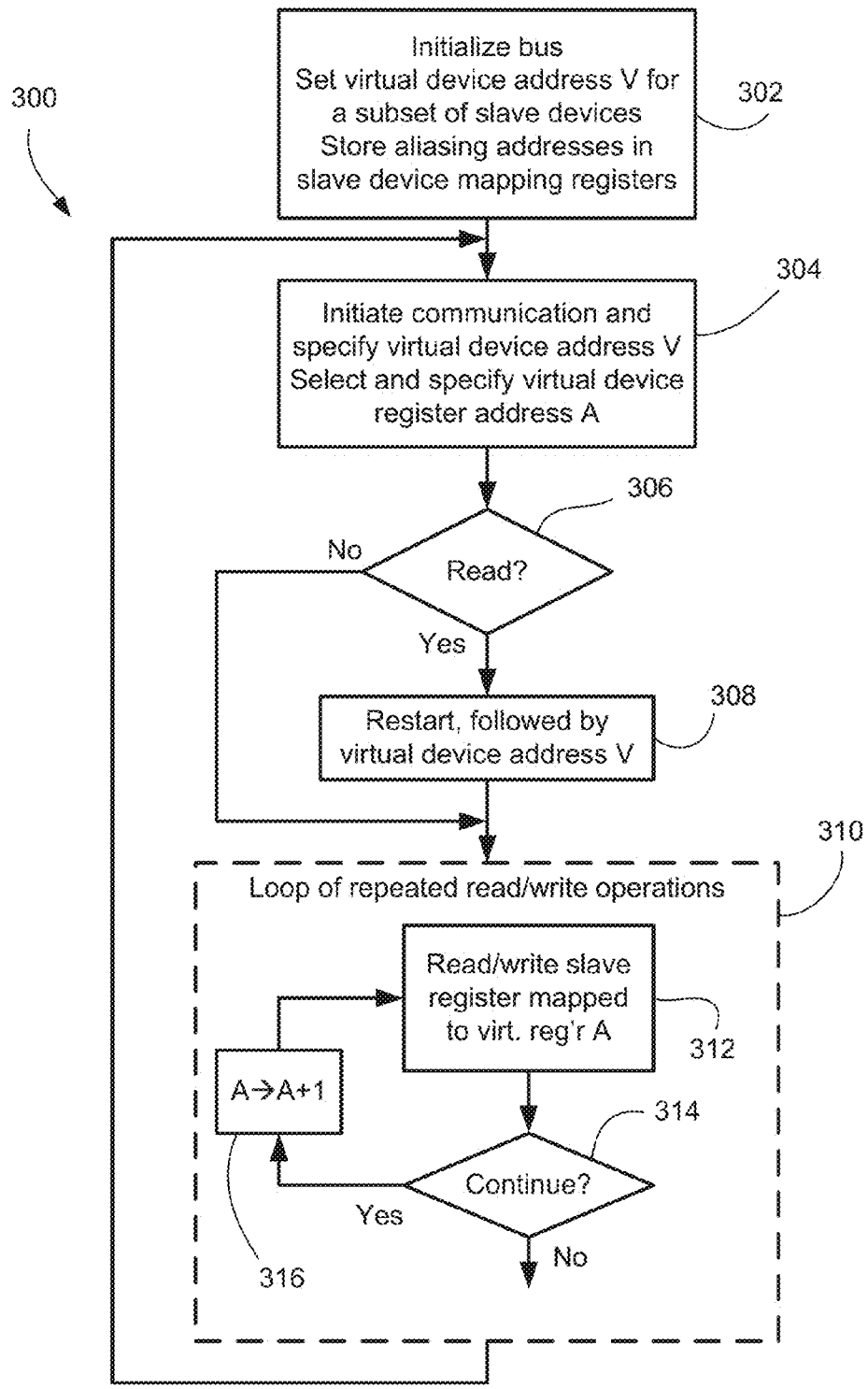
FIG. 7 shows an example method for communications between a master device and a plurality of slave devices on a communications bus with a common data line.

Reference is now made to FIG. 7, which shows one example method 300 for communications between one or more master devices and a plurality of slave devices on a communications bus with a common data line. The method 300 uses the multi-device communication structure 250 described in connection with FIG. 6. That is, the method 300 uses aliasing data to map virtual device registers to corresponding slave device registers.

As shown in operation 302, the virtual device address V is stored in subset of slave devices. In one embodiment, the subset includes all slave devices on the bus, but in other embodiments, it includes one or more but fewer than all of the slave devices on the bus. Each slave device that is part of the subset is configured to respond to its own slave device address ($S_1, S_2, \ldots, S_N$) and to the virtual device address (V). Aliasing data is stored inside each slave device in the subset. In some embodiments, only the aliasing data relating to a slave device register local to a specific slave device is stored at that slave device. In this embodiment, the aliasing data maps a series of sequential virtual device addresses to slave device addresses. As an example, the aliasing data may specify:

| Slave Device | Slave Register Address | Virtual Register Address |
|---|---|---|
| $S_1$ | 00101000 | 00000110 |
| $S_2$ | 00100010 | 00000111 |
| $S_2$ | 00010001 | 00001000 |
| $S_3$ | 01000101 | 00001001 |
| $S_4$ | 01110010 | 00001010 |
| $S_5$ | 00000100 | 00001011 |

In operation 304, the master device initiates a communication on the bus with a start symbol followed by the virtual device address V. The master device then indicates read or write, receives an ACK from the slave devices that correspond to the virtual device address, and indicates a first virtual register address. The virtual register address may be the first address in the sequence of virtual register addresses in many embodiments (e.g. 0000110, in the above example). This is then again followed by an ACK from the slave devices.

Operations 306 and 308 reflect that the master device will send a repeated start symbol followed by the virtual device address if the master device is performing a read operation, as typically implemented using the I²C protocol.

In operation 310, the master device performs the multi-device read or write operation. Operation 310 first includes conducting the read/write with respect to the virtual register address referenced in operation 304, as shown by operation 312. If the master device is performing a read operation, then in operation 312 the slave device that has the slave register that maps to the virtual register address outputs the data from that register onto the bus in that timeslot. If the master device is performing a write operation, then in operation 312 the master device puts the data to be written on the bus in that timeslot, and the corresponding slave device writes that data to the slave register that map to this virtual register address. In some embodiments only a single device is being addressed during operation 310, this has the advantage that reading or writing from multiple independent register locations can quickly be performed while still getting a unique ACK response from the single device.

In operation 314, the master device determines whether the multi-device read/write operation is completed. If not, then in operation 316 the virtual register address is incremented automatically inside the master and slave devices, the master sends an ACK (in case of read), and operation 312 is repeated, but with respect to the incremented virtual device address, which the aliasing data may map to a different slave device and different slave device register.

When a multi-device read operation is completed, the master device outputs a NACK and a stop symbol to the bus to signal the end of the message. Similarly, at the end of a multi-device write operation, the last slave device will signal an ACK and the end of the write sequence.

In another example embodiment, the virtual device address may be associated with a predefined sequence of slave devices/registers, such that when the master device reads from or writes to the virtual device address, it is understood as invoking a series of associated sequential read/write operations with the associated slave devices/registers in a predefined time-multiplexed sequence. In this embodiment, a single message may include both read and write operations to or from multiple devices mixed together.

In yet a further example embodiment, the sequence may have virtual device registers associated with each stage/step of the sequence, i.e. a respective virtual device register may be mapped or aliased to the slave device register to be read from or written to in each step of the sequence. Accordingly, the master device may read from or write to a portion of the sequence by specifying a virtual device register that corresponds to an intermediate step/stage of the sequence. The multi-device read/write operation would then continue from that step/stage through the remainder of the sequence. In some embodiments, the I²C read/write bit may be ignored, and the read or write operation may be determined by proper initialization of the slave devices thereby enabling the combination of read and write operations in a single message.

In yet another example embodiment, more than one predefined sequence may be predefined for the devices on the bus. The two or more sequences may involve different slave devices, the same slave devices in different orders, different slave device registers, the same slave device registers in different orders, or any overlapping combination thereof. Each sequence has an associated virtual device address, such that the master device may select and initiate a read/write operation for a particular sequence by using that sequence's associated virtual device address.

Implementation of the sequential read/write operations for a sequence includes providing each slave device in the subset of slave devices included in the sequence with the corresponding virtual device address. Each slave device also stores data or information that indicates the timeslot or order in which the slave device is to respond to the read/write operation. For example, in one embodiment each slave device may be assigned an ordinal indicating in which timeslot it is to respond, and the slave devices then each count the number of timeslots in a communication addressed to the virtual device address to determine in which timeslot they are to respond.

Figure 8:
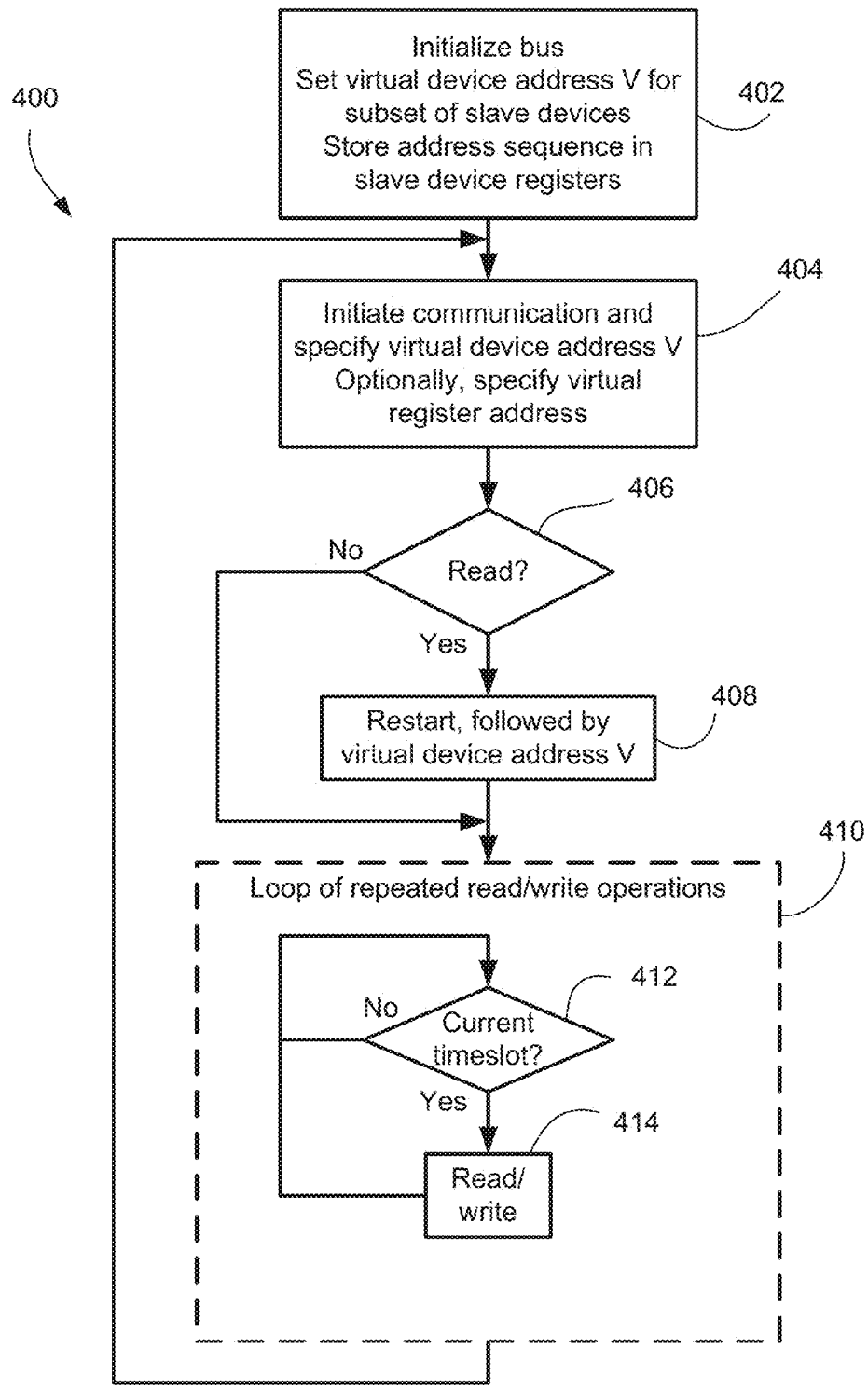
FIG. 8 shows another example method for communications between a master device and a plurality of slave devices on a communications bus with a common data line.

Reference is now made to FIG. 8, which shows, in flowchart form, an example method 400 for communications between a master device and a plurality of slave devices on a communications bus with a common data line. The method involves specifying a virtual device address that corresponds to a predefined sequence of slave devices and/or slave device registers.

As shown in operation 402, for at least one sequence, an associated virtual device address V is stored in the subset of slave devices to be involved in the sequence. The sequence may, in some instances, include specified virtual device registers that correlate to individual slave device registers as a mechanism for specifying a starting point in the sequence other than the first device/register of the sequence. Data is also stored at each slave device in the subset that indicate the order or timeslot in which the slave device is to respond. In some embodiments, the order data further indicates a specific slave device register local to that specific slave device that is to be read from or written to in that timeslot.

In operation 404, the master device initiates a communication on the bus with a start symbol followed by the virtual device address V. The master device then indicates read or write, and receives an ACK from the slave devices that correspond to the virtual device address.

In some embodiments, the master device may then also indicate a first virtual register address to specify a starting point in the sequence other than the first register/device.

It will also be appreciated that, in some embodiments, the virtual device address may be associated with a sequential read/write operation involving two or more sequences, and the virtual device register specified in the communication may indicate which of the sequences is being invoked by the master device. That is, each sequence may be associated with a virtual device register address, and the virtual device address only signals that a sequential read/write operation is to be performed.

In some embodiments, the first value transmitted in the sequence following the virtual slave device address will indicate what sequence of registers are to be read, thereby enabling multiple sequences to be initiated, thereby enabling a single virtual device address to initiate several sequences.

As indicated by operations 406 and 408 the master device may send a repeated start symbol followed by the virtual device address if the master device is performing a read operation in the case where a virtual device register address has been specified. If no virtual device register address is being specified, the master device may initiate the read operation without necessarily requiring the sending of a repeated start symbol.

In operation 410, the master device performs the multi-device read or write operation. Operation 410 first includes conducting the read/write with respect to the first slave device/register in the selected sequence (or with respect to the slave device/register corresponding to the stage of the sequence associated with virtual register address referenced in operation 404 in some embodiments). Each read/write operation is then performed in turn in the order predefined by the selected sequence in the respective timeslots in the communication.

As indicated by operations 412 and 414, the slave devices involved in the sequence monitor the communication on the bus to identify when it is their turn to respond. This may, in some embodiments, include maintaining a count of timeslots and comparing the count to the stored data indicating the timeslot(s) assigned to that slave device/register.

While conducting the sequential read or write in operation 410, the master device determines whether the multi-device read/write operation is completed (which may or may not correspond to the end of the sequence, for example if the master device does not intend to read/write the full sequence). If the multi-device read/write operation is completed, then the master device outputs a stop symbol to the bus to end the message.

It may be appreciated, that the presented methods are backwards compatible with the existing I²C protocol, yet allow for an expansion in the way devices and registers are addressed. This enables an increase in the transfer efficiency for many use cases. The backwards compatibility ensures existing devices can be attached to the same bus as enhanced devices and existing test equipment such as bus protocol analysers can be used without requiring any updates to test, debug and verify operation of the extended operation of the bus.

In some embodiments, quantity of information written to or read from the slave devices may be a single bit. A data package with a word length as short as a single bit may be used to control relays, actuators or to read a control value from a switch. In other cases, the single bit may be utilized as a virtual "wire", thereby connecting multiple entities using two wires to convey a multitude of information. As an example, multiple wires are often used for control. This increases the number of wires and physical size of the system and puts requirements on the available number of I/O pins needed to connect two or more devices. By using a single bit as the information carrying container, the value can be seen as a sample from a virtual wire between two or more devices thereby simplifying the programming and physical layout of such a system. In many cases, the cost of such a system will be significantly lower due to the smaller size of the board and lower number of terminals required. In some cases, it is important that the updating or reading of one value is performed simultaneously with another one, thereby often necessitating the use of multiple wires. However, if the received messages are stored in a buffer, all the values can be updated simultaneously, e.g. at the end of a message. Similarly, if the sampled values are stored in a buffer, it is possible to sample several values simultaneously and avoid any skew between the sample events. Notice, that wired-OR, NRZI and similar signalling schemes do not preclude multiple devices signalling at the same time. Therefore, the single bit carrying information can truly represent signalling from multiple devices at the same time thereby solving any problems associated with multiple drivers. In this respect the virtual wire works as true tunnelling of information. As an example multiple devices are often merged on a common interrupt signalling line. This line may then be removed and be part of the new signalling scheme thereby saving cost and space.

Figure 9:
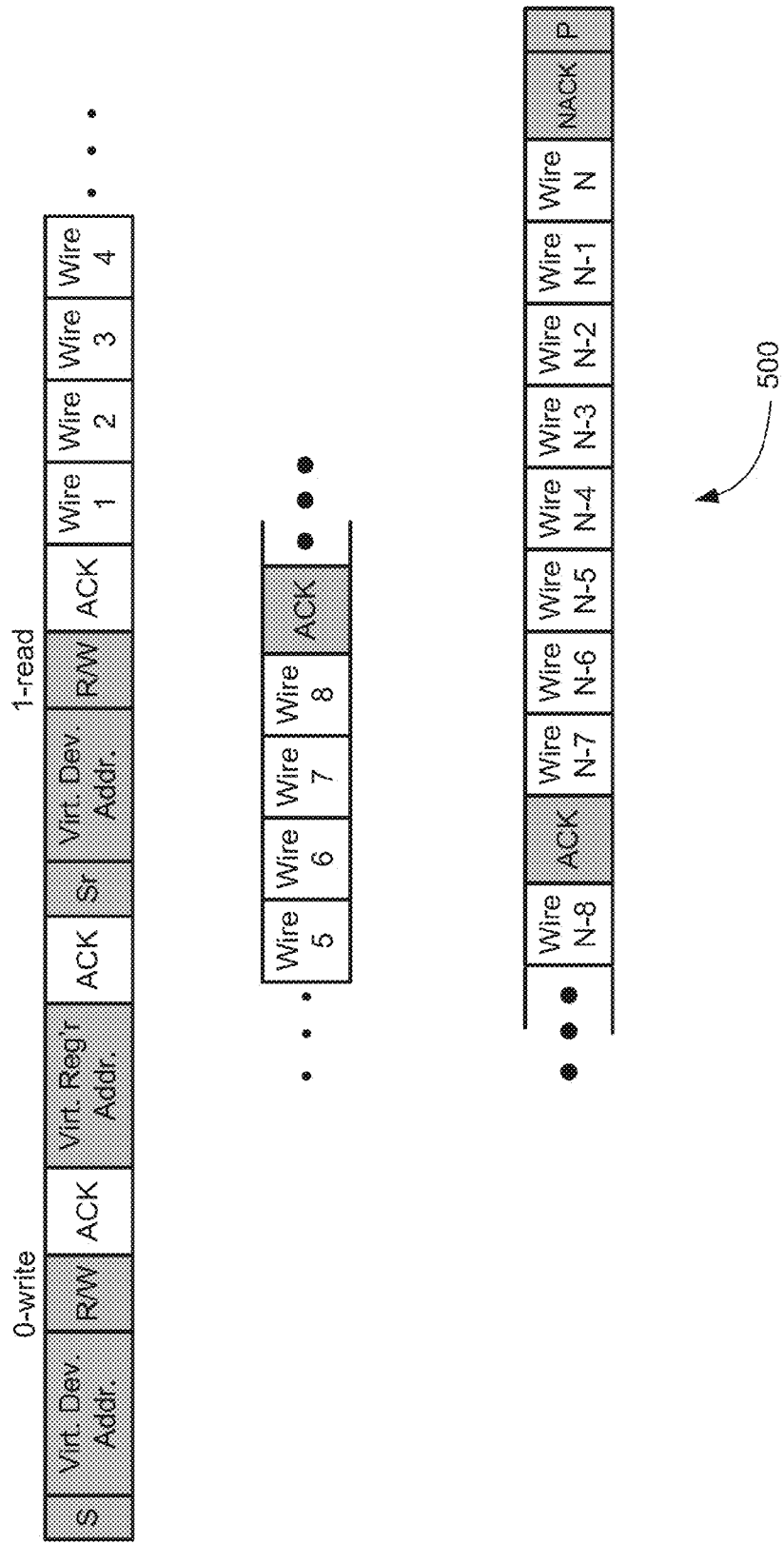
FIG. 9 diagrammatically illustrates an example structure for virtual wire communications.
Figure 10:
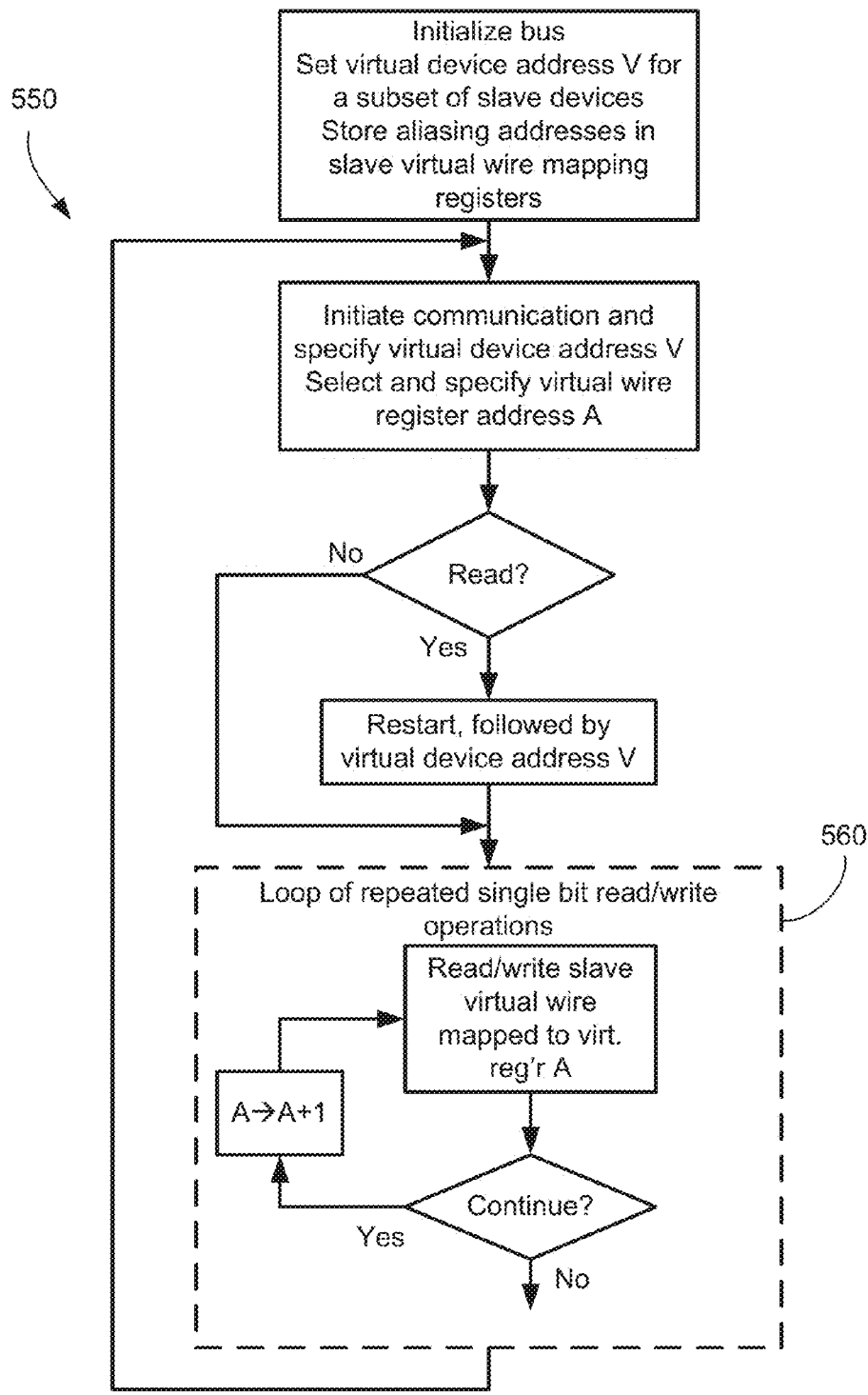
FIG. 10 shows, in flowchart form, an example method for virtual wire communications.

FIG. 9 shows an example structure 500 of a message based on virtual wires, as described above. FIG. 10 shows, in flowchart form, an example process 550 for communications between a master device and a plurality of slave devices on a communications bus with a common data line using a virtual wire protocol, as described above. The example process 550 features a loop 560 of read/write operations in which each virtual wire is mapped to a respective register location in a respective slave device.

It will be appreciated that the processes and systems according to the present application may be implemented in a number of computing devices, including, without limitation, servers, suitably-programmed general purpose computers, and mobile devices. The processes may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the devices described herein and the module, routine, process, thread, or other software components implementing the described methods/processes may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of a master device reading from or writing to a plurality of slave devices connected to a communications bus having a common data line, each slave device having an associated slave device address, the method comprising:
providing each of the slave devices with a virtual device address different from any of the slave device addresses, wherein each of the slave devices is addressable by the master device using the associated slave device address or the provided virtual device address;
initiating, by the master device, a communication on the bus by signaling a start of the communication followed by the virtual device address on the data line;
the slave devices detecting the start of the communication and the virtual device address and, in response,
identifying a register in that slave device associated with the virtual device address, and,
each slave device, in sequence, performing a bus read/write operation with regard to its identified register in a respective predetermined time slot within the communication on the data line; and
terminating, by the master, the communication by signaling an end of the communication.

2. The method claimed in claim 1, wherein providing each of the slave devices with the virtual device address comprises the master writing the virtual device address to a designated register in that slave device.

3. The method claimed in claim 2, wherein writing the virtual device address further includes writing a respective virtual register address, wherein the respective virtual register address is mapped to said identified register.

4. The method claimed in claim 1, wherein each slave device stores an association between a respective virtual register address for the virtual device address and the identified register in that slave device, and wherein identifying comprises reading the association to identify the register.

5. The method claimed in claim 1, wherein each slave device contains aliasing data that maps a slave device register address in that slave device to a respective virtual device register address.

6. The method claimed in claim 1, wherein initiating further includes the master device signaling, following the virtual device address, a virtual device register address on the data line.

7. The method claimed in claim 6, wherein each slave device contains aliasing data that maps a slave device register address in that slave device to a respective virtual device register address, and wherein identifying a register in that slave device associated with the virtual device address comprises one of the slave devices determining that the virtual device register address on the data line corresponds to the respective virtual device register address mapped to that slave devices' slave device register address.

8. The method claimed in claim 7, wherein the virtual device register addresses are sequential, and wherein each slave device, in sequence, performing a bus read/write operation comprises performing the bus read/write operation in order of the sequence of virtual device register addresses starting with the virtual device register address signaled by the master device on the data line.

9. The method claimed in claim 8, wherein the bus read operations continue through the sequence as the master device outputs an acknowledge symbol after each read operation and until the master device outputs a not-acknowledge and stop symbol.

10. The method claimed in claim 8, wherein the bus write operations continue through the sequence as the respective slave device outputs an acknowledge symbol after each write operation and until the master device outputs a stop symbol.

11. The method claimed in claim 1, wherein each identified register is associated with a respective virtual device register address, the virtual device register addresses are sequential, and wherein the sequence comprises a predetermined sequence of slave device registers that corresponds, in order, to the sequential virtual device register addresses.

12. The method claimed in claim 1, wherein providing includes providing each of the slave devices with more than one virtual device address, and wherein the each virtual device address is associated with a sequence of slave device registers, and wherein the method further includes the master device selecting between the virtual device addresses to start a corresponding sequence of read and write operations.

13. The method claimed in claim 1, wherein the sequence of read/write bus operations are performed without a start symbol or repeated start symbol between the individual read/write bus operations.

14. The method of claim 1, where each data packet read from a slave is preceded or followed by an acknowledgement bit from the slave device that is the source of that data packet in order to uniquely determine if the slave device is taking part in the communication sequence.

15. A bus communication system, comprising:
a master device;
a plurality of slave devices, each slave device having an associated slave device address and storing a virtual device address different from any of the slave device addresses, wherein each slave device is addressable by the master device using the associated slave device address or the stored virtual device address; and
a communications bus having a common data line interconnecting the master device and the plurality of slave devices,
wherein the master device is to initiate a communication on the bus by signaling a start of the communication followed by the virtual device address on the data line,
wherein the slave devices are to detect the start of the communication and the virtual device address and, in response,
identify a register in that slave device associated with the virtual device address, and, in sequence, perform a bus read/write operation with regard to its identified register in a respective predetermined time slot within the communication on the data line, and
wherein the master device is to terminate the communication by signaling an end of the communication.

16. The system claimed in claim 15, wherein each of the slave devices stores the virtual device address in a designated register in that slave device to hold the virtual device address.

17. The system claimed in claim 16, wherein each of the slave devices stores a respective virtual register address, and wherein in each slave device the respective virtual register address is mapped to said identified register.

18. The system claimed in claim 16, wherein each slave device stores an association between a respective virtual register address for the virtual device address and the identified register in that slave device, and wherein identifying comprises reading the association to identify the register.

19. The system claimed in claim 15, wherein each slave device contains aliasing data that maps a slave device register address in that slave device to a respective virtual device register address.

20. The system claimed in claim 15, wherein the master device is further to initiate the communication by signaling, following the virtual device address, a virtual device register address on the data line.

21. The system claimed in claim 20, wherein each slave device contains aliasing data that maps a slave device register address in that slave device to a respective virtual device register address, and wherein one of the slave devices is to determine that the virtual device register address on the data line corresponds to the respective virtual device register address mapped to that slave devices' slave device register address.

22. The system claimed in claim 21, wherein the virtual device register addresses are sequential, and wherein each slave device, in sequence, performs a bus read/write operation by performing the bus read/write operation in order of the sequence of virtual device register addresses starting with the virtual device register address signaled by the master device on the data line.

23. The system claimed in claim 22, wherein the bus read operations continue through the sequence as the master device outputs an acknowledge symbol after each read operation and until the master device outputs a not-acknowledge and stop symbol.

24. The system claimed in claim 22, wherein the bus write operations continue through the sequence as the slaves devices outputs an acknowledge symbol after each operation and until the master device outputs a stop symbol.

25. The system claimed in claim 15, wherein each identified register is associated with a respective virtual device register address, the virtual device register addresses are sequential, and wherein the sequence comprises a predetermined sequence of slave device registers that corresponds, in order, to the sequential virtual device register addresses.

26. The system claimed in claim 15, wherein each of the slave devices further stores more than one virtual device address, and wherein the each virtual device address is associated with a sequence of slave device registers, and wherein the master device is to select between the each virtual device address to start a corresponding read or write sequence.

27. The system claimed in claim 15, wherein the sequence of read/write bus operations are performed without a start symbol or repeated start symbol between the individual read/write bus operations.

28. The system claimed in claim 15, wherein the sequence of read bus operations are performed with each data packet being preceded or follow by an acknowledgement bit to signal the presence of the slave device on the bus.

29. A non-transitory processor-readable medium storing processor-executable instructions which, when executed, cause one or more processors to perform the method claimed in claim 1.

* * * * *